F. C. CAVE.
RESILIENT TIRE.
APPLICATION FILED NOV. 29, 1918.
1,335,820. Patented Apr. 6, 1920.
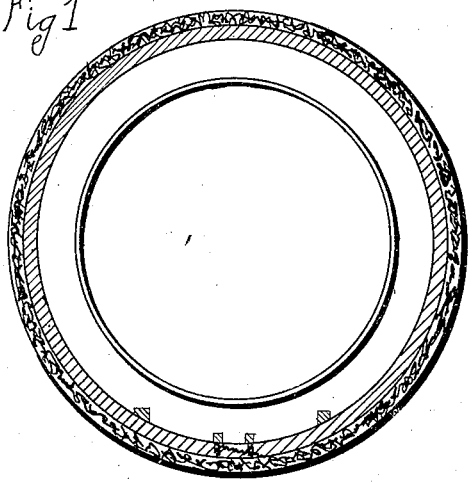
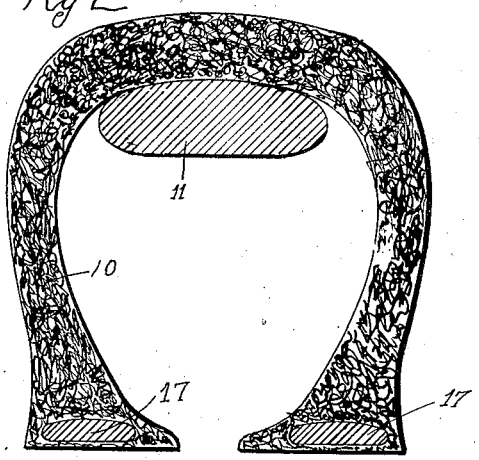
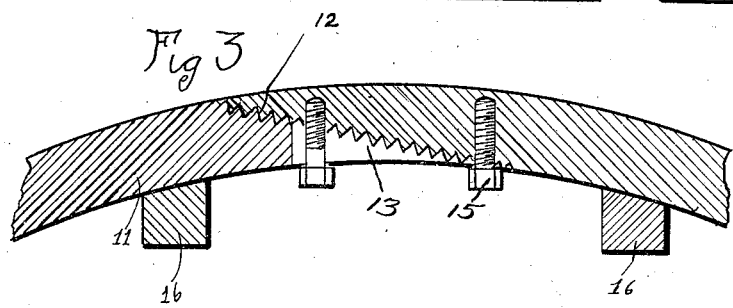
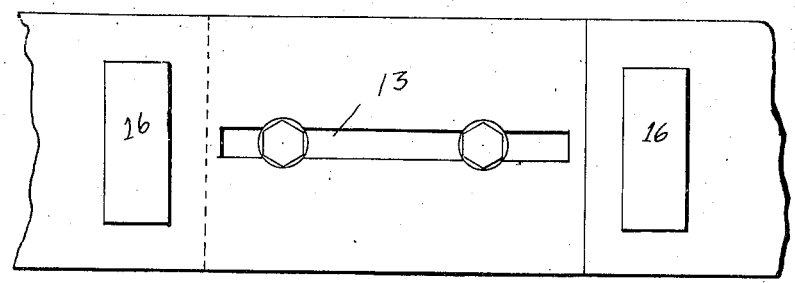
Witness
Nevin Trissel
Inventor
FREDERICK C. CAVE
By Dwig & Back Attys

UNITED STATES PATENT OFFICE.

FREDERICK C. CAVE, OF DES MOINES, IOWA.

RESILIENT TIRE.

1,335,820.  Specification of Letters Patent.  Patented Apr. 6, 1920.

Application filed November 29, 1918. Serial No. 264,658.

*To all whom it may concern:*

Be it known that I, FREDERICK C. CAVE, a citizen of the United States, and a resident of Des Moines, in the county of Polk and State of Iowa, have invented a certain new and useful Resilient Tire, of which the following is a specification.

The object of my invention is to provide a resilient tire of simple, durable and inexpensive construction which will serve as a substitute for a pneumatic tire.

More particularly it is my object to provide a tire of the kind mentioned, having a casing with an annular resilient ring therein, and with annular resilient rings adapted to fit the felly or rim of the wheel.

With these and other objects in view my invention consists in the construction, arrangement and combination of the various parts of the device, whereby the objects contemplated are attained, as hereinafter more fully set forth, pointed out in my claim and illustrated in the accompanying drawings in which:

Figure 1 shows a vertical, sectional view through a tire embodying my invention.

Fig. 2 shows an enlarged, transverse sectional view through the same.

Fig. 3 shows a vertical, sectional view through a portion of the larger resilient ring illustrating the structure of the joint therein; and Fig. 4 shows an interior plan view of said resilient ring at the joint.

In the accompanying drawings I have used the reference numeral 10 to indicate generally a casing somewhat similar in construction to the ordinary casing for a pneumatic tire made of flexible and preferably of somewhat resilient material.

Mounted in the casing and designed to fit against the interior of the tread portion thereof is an annular split ring 11. The ring 11 is split along a beveled line, as illustrated in Fig. 3, and the adjacent surfaces are provided with corrugations 12 which are shown in Fig. 3 in somewhat exaggerated form.

The outer overlapping end of the ring is provided with screw-threaded openings and the inner overlapping portion is provided with a longitudinally, elongated slot 13.

Screw-bolts 15 are extended through the slot 13 and into the screw-threaded openings in the outer overlapping portion of the ring 11.

The ring 11 is provided on its interior on opposite sides of the joint therein with lugs 16.

The casing 10 is provided at its free edges with a pair of annular rings 17, shown in Fig. 2, which are covered by the material of the casing, and are designed to fit snugly adjacent to the felly of the wheel, or adjacent to a demountable rim.

The device is preferably used in connection with a demountable rim.

In installing the device the ends of the ring 11 are locked together by means of the screw-bolts 15 with the ring on the interior of the casing, and the casing is then slid on to the demountable rim and may be locked in the ordinary way on the wheel.

If it is desired to slightly expand the ring 11, the casing is removed from the demountable rim, the screws 15 are loosened and a jack is placed against the lugs 16 and used to force the ends of the ring apart. When the ring 11 has been expanded to the proper point, the screw-bolts are tightened and the corrugated faces on the ring will hold the adjacent ends of the ring against any slippings.

In the use of my improved resilient tire the entire tread surface will be stretched, except where the tire is in contact with the road. At this point the sides of the tire will be bulged outwardly slightly and the tread of the tire at this point will be pushed nearer to the rim of the wheel.

The resilient ring 11 gives the tire resiliency and the rings 17 prevent the tire from being pulled off the rim at the top of the wheel.

My improved resilient wheel does away with the necessity for pneumatic tires, and yet will travel without any more noise than the ordinary pneumatic tire.

Some changes may be made in the construction and arrangement of the parts of my improved resilient tire without departing from the essential spirit and purpose of my invention, and it is my intention to cover by my claim any modified forms of structure or use of mechanical equivalents which may be included within its scope.

I claim as my invention:

In a device of the class described, a flexible casing, non-extensible rings secured in said casing adjacent to the portion designed to engage the periphery of a wheel, an annular resilient and somewhat flexible extensible ring adapted to be received in said flexible casing and rest adjacent to the inner surface of the tread portion of said casing, said ring being split along a beveled line, forming beveled surfaces having coacting corrugated portions whereby slippage of the ends of said ring will be prevented, said ring being capable of adjustment to various positions, means for locking the ends of said ring together for holding said ring in any of its adjusted positions, said locking means comprising set screws fixed in one end of said ring, and adapted to extend through the other end, whereby said set screws may be tightened to hold said ring in any of its positions.

Des Moines, Iowa, October 2, 1918.

FREDERICK C. CAVE.